United States Patent [19]

Domries

[11] Patent Number: 4,501,333
[45] Date of Patent: Feb. 26, 1985

[54] DISC TYPE AGRICULTURAL IMPLEMENT

[76] Inventor: Bernard O. Domries, 12281 Road 29, Madera, Calif. 93637

[21] Appl. No.: 317,154

[22] Filed: Nov. 2, 1981

[51] Int. Cl.³ .............................................. A01B 21/08
[52] U.S. Cl. ..................................... 172/441; 172/595
[58] Field of Search ............... 172/441, 440, 442, 595, 172/596, 584, 579, 580, 587, 455, 454, 591, 588, 598, 178, 581, 582, 585, 741, 476, 477, 667

[56] References Cited

U.S. PATENT DOCUMENTS

| | | | |
|---|---|---|---|
| 1,033,330 | 7/1912 | Lindgren | 172/582 X |
| 2,191,537 | 2/1940 | Miller | 172/583 |
| 2,352,963 | 7/1944 | McMahon | 172/574 X |
| 2,533,129 | 12/1950 | Martin | 172/667 X |
| 2,609,647 | 9/1952 | Love | 172/595 X |
| 2,692,544 | 10/1954 | Jessup | 172/178 |
| 2,727,453 | 12/1955 | Altgelt | 172/454 X |
| 2,905,255 | 9/1959 | Kampe | 172/441 |
| 2,907,394 | 10/1959 | Cook | 172/582 X |
| 2,944,387 | 8/1960 | Lehman | 172/587 |
| 2,955,664 | 10/1960 | Oehler | 172/581 |
| 3,080,933 | 3/1963 | Kramer | 172/582 |
| 3,193,023 | 7/1965 | Adee | 172/311 |
| 4,211,284 | 7/1980 | Collado | 172/151 |
| 4,271,912 | 6/1981 | Frye | 172/441 |

FOREIGN PATENT DOCUMENTS

| | | | |
|---|---|---|---|
| 268830 | 6/1964 | Australia . | |
| 604973 | 3/1960 | Italy . | |
| 849677 | 9/1960 | United Kingdom | 172/445.1 |

OTHER PUBLICATIONS

Deep Tillage Implements, Advertising brochure of Allis-Chalmers, Milwaukee, WI, Front, Rear and p. 3.
K-107, King Double Offset Harrow, Advertising pamphlet of King Plow Co, Atlanta, GA.

Primary Examiner—Richard J. Johnson
Attorney, Agent, or Firm—Huebner & Worrel

[57] ABSTRACT

Disclosed is an agricultural implement for cultivating about trees and vines. The implement includes a frame that mounts four gangs of disc blades, two forward and two aft. The disc blade gangs are relatively movable to set up a variety of discing patterns and the gang can be so mounted on the frame that the lateral extensions of the frame do not extend above the height of the disc blades.

14 Claims, 14 Drawing Figures

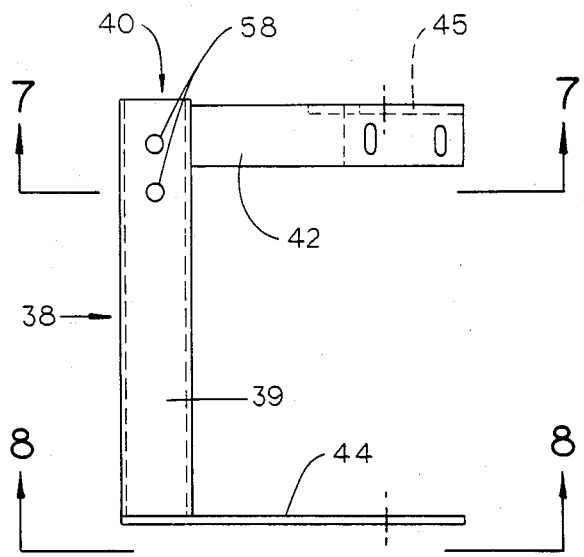
FIG. 6
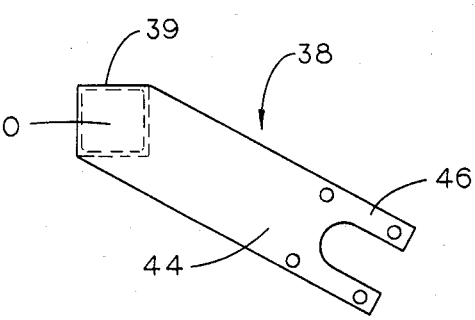
FIG. 10
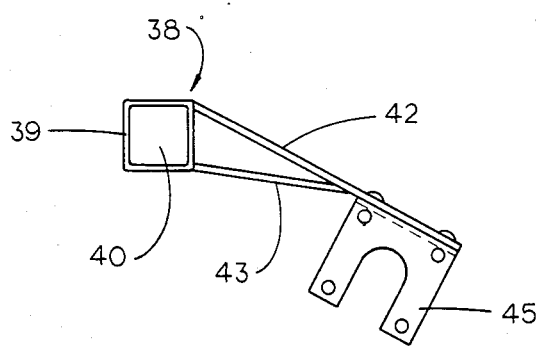
FIG. 7
FIG. 8
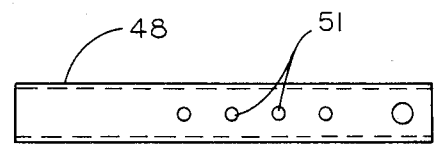
FIG. 9
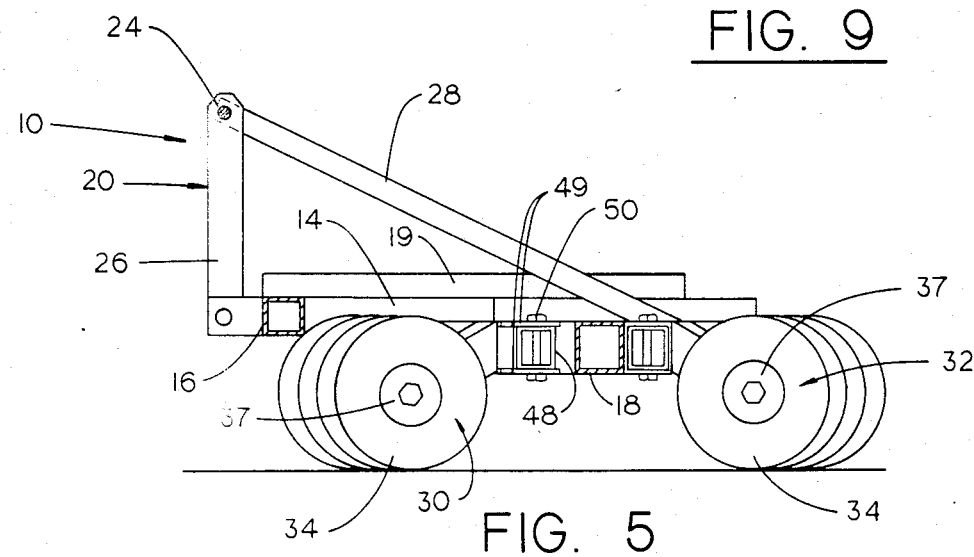
FIG. 5

DISC TYPE AGRICULTURAL IMPLEMENT

BACKGROUND OF INVENTION

This invention relates generally to agricultural implements for cultivating soil and particularly to disc implements for cultivating close to trees and vines for weed and irrigation control.

Agricultural implements utilizing disc gangs for cultivating soil are well known. The use of an assembly of disc gangs on a frame adapted for three point mounting to a tractor for cultivating around trees in orchards and vines in vineyards for weed and irrigation control is also well known. To add versatility to such implements various means have been developed to permit relative repositioning of the gangs of discs, one to the other, to change the cultivation patterns for adaption to different applications. Such versatile gang disc implements have attained wide usage in orchard and vineyard cultivation. The smaller units are applied to the rear of a tractor on a three point mounting and lifted for stowage or lowered for use by the hydraulic system of the tractor. One problem which presents itself in the utilization of such implements in vineyards and in orchards with low branches is that the branches of the vines or trees fall in such close proximity to the ground that discing with the implement in close to the tree or vine stump tends to cause damage to the lower limbs. This damage is inflicted primarily by the frame which supports the disc gangs since in the typical configuration the lateral portions of the frame extend upwardly above the discs themselves. To avoid such interference, attempts have been made to provide a disc gang implement with a low profile. That is, an implement in which the lateral portions of the frame do not extend above the height of the disc blades. However, the problem with the low profile disc gang implements heretofore known is that they do not permit convenient adjustment of the angles of the disc gangs relative to one another and, therefore, fail to provide the versatility of cultivation patterns which the normal profile gang disc implement provides.

A need, therefore, exists for a disc gang implement which permits convenient relative adjustment of the disc gangs, one to the other, readily to achieve different cultivation patterns, and, at the same time, allows arrangement of the lateral portions so they do not extend above the disc blades.

It is, therefore, a major object of my invention to provide a disc gang implement in which the disc gangs are relatively adjustable both angularly and laterally, and the lateral portions can be disposed below the tops of the disc blades.

It is another important object of my invention to provide improved adjustment means which permits angular and lateral adjustment of the disc gangs more quickly and conveniently. It is another important object of my invention to provide improved adjustment means which permit angular and lateral adjustment of the disc gangs more quickly and conveniently.

It is also an important object of my invention to provide a disc gang implement of the type described in which four separate disc gangs, two fore and two aft, are provided.

It is another object of my invention to provide a disc gang implement of the type described wherein the disc gangs are so adjustable one to the other as to permit the formation of substantially the same discing patterns as provided by a normal profile disc.

It is still another object of my invention to provide a disc gang implement of the type described which is readily mountable to a tractor on a three point hitch.

It is still a further object of my invention to provide a disc gang implement of the type described which is relatively inexpensive to manufacture, is durable, and easy to use.

These and other objects and advantages of my invention will become more readily apparent from a reading of the detailed description of parts and the accompanying drawings in which:

BRIEF DESCRIPTION OF THE DRAWINGS

FIG. 5 is a longitudinal vertical section of the preferred embodiment of my invention taken on 5—5 in FIG. 4;

FIG. 6 is a somewhat enlarged plan view of the disc gang frame of my preferred embodiment;

FIG. 7 is a sectional view of the disc gang frame taken on 7—7 in FIG. 6;

FIG. 8 is an end view of the disc gang frame taken from a position indicated by line 8—8 in FIG. 6;

FIG. 9 is a plan view of one of the pivotal mounting arms on which the disc gang frames are mounted in my preferred embodiment;

FIG. 10 is a somewhat enlarged fragmentary view view of a pivotal mounted arm taken from a position indicated by line 10—10 in FIG. 3 showing its pivotal attachment to the implement frame and having a disc gang frame mounted thereon;

DESCRIPTION OF THE PREFERRED EMBODIMENTS

Figure 1:
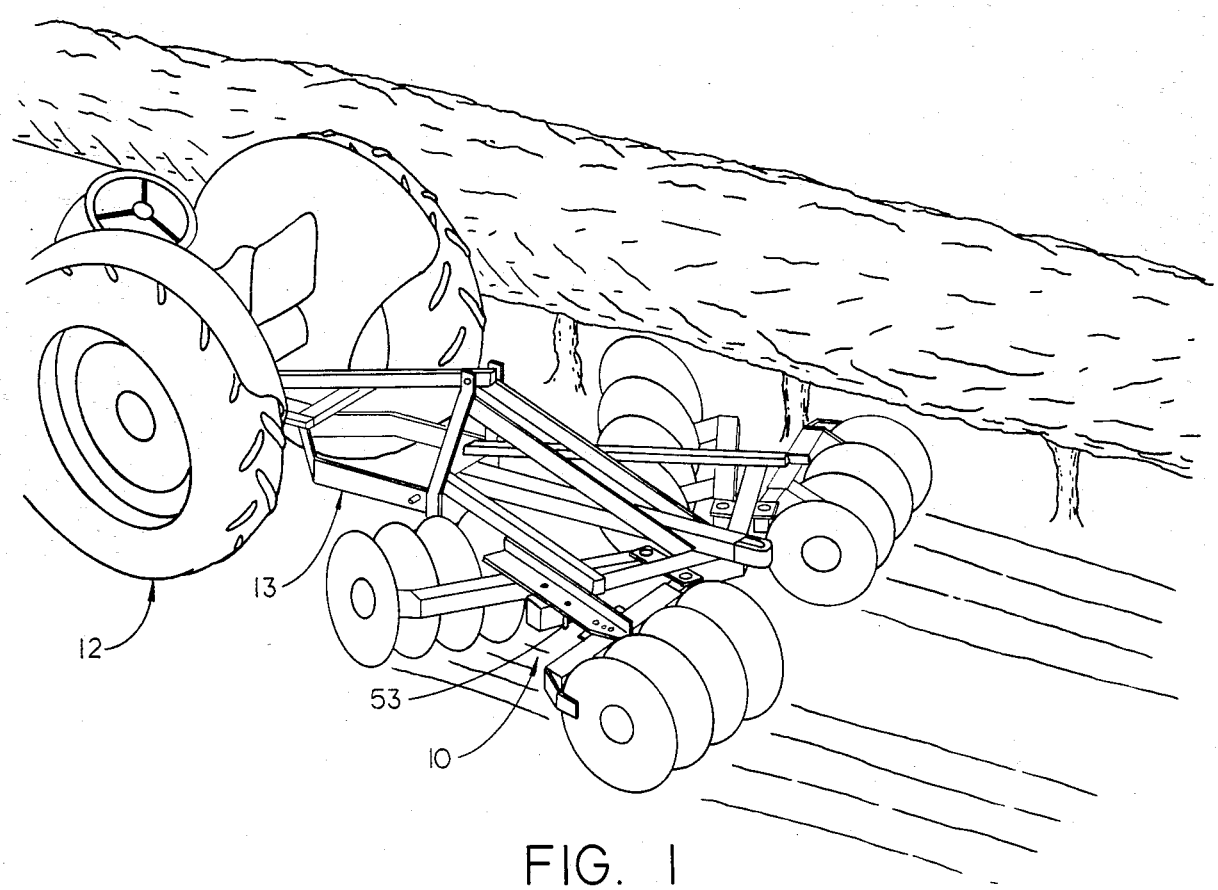
FIG. 1 is a perspective view of a preferred embodiment of my improved disc implement invention shown mounted on the three point hitch of a tractor.
Figure 2:
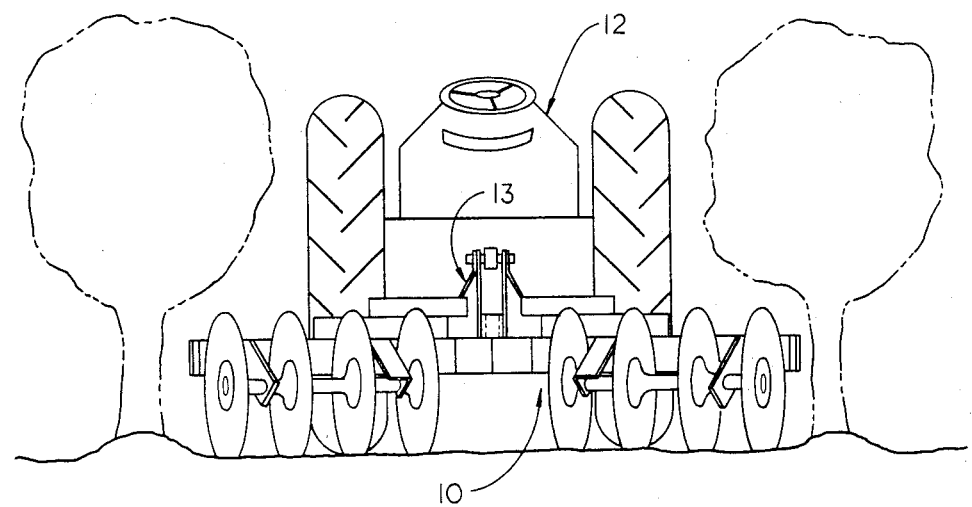
FIG. 2 is a rear elevational view of the preferred embodiment of my invention shown in FIG. 1.
Figure 3:
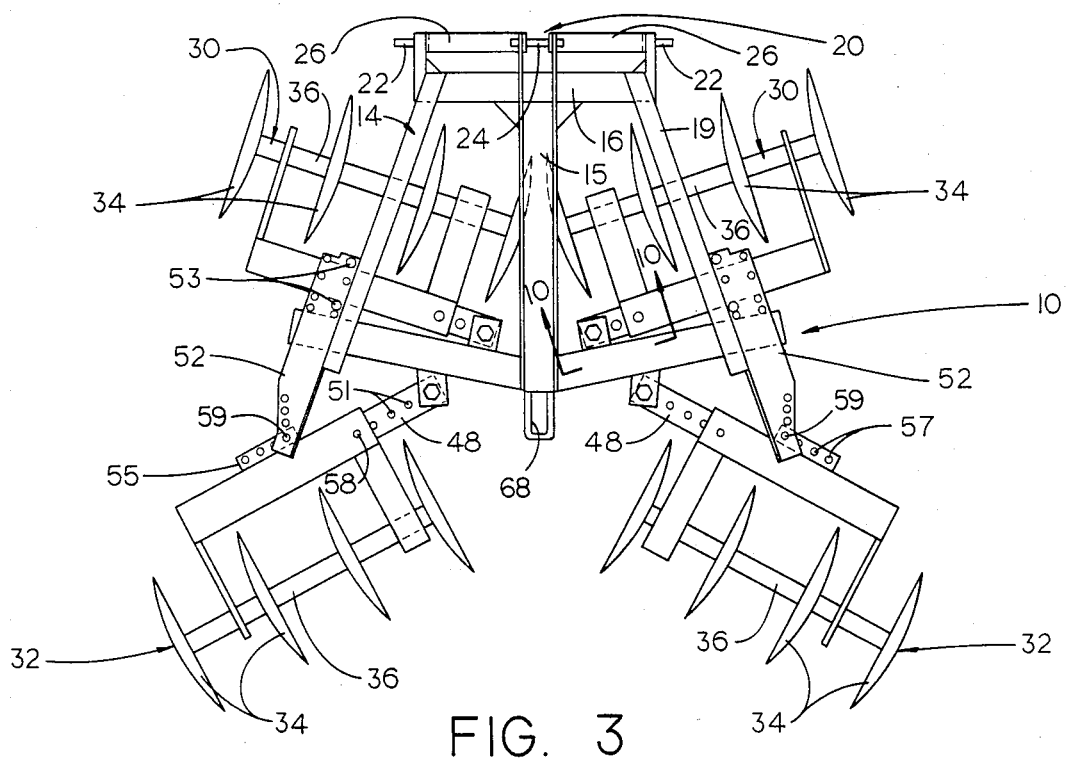
FIG. 3 is a top plan view of the preferred embodiment of my invention with the disc gangs positioned for a particular cultivation pattern.
Figure 4:
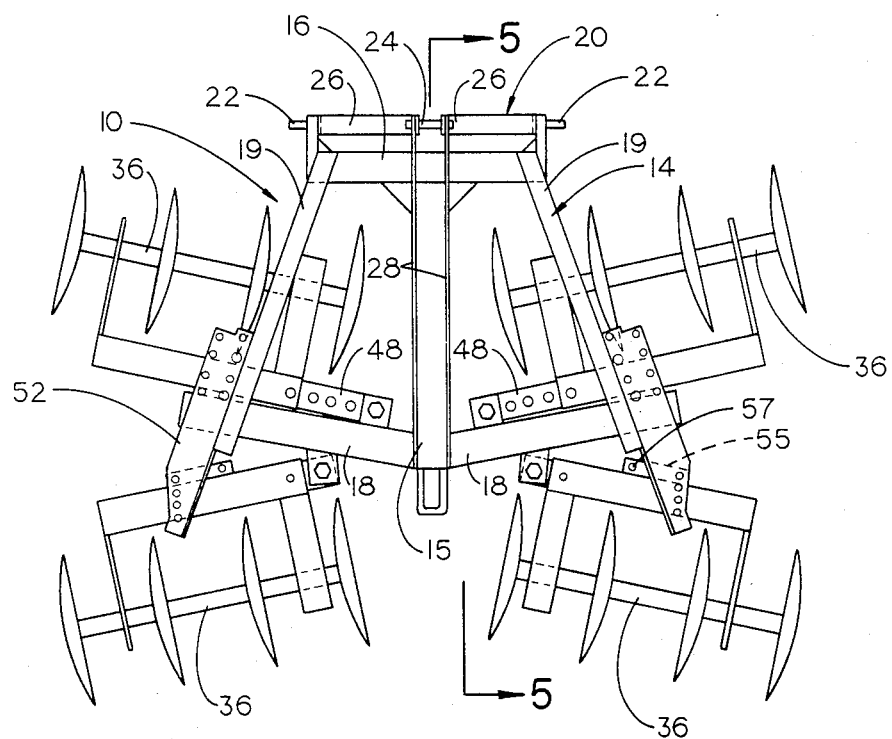
FIG. 4 is a top plan view of the preferred embodiment but with the disc gangs in a different position from FIG. 3.

Referring now to the drawings and particularly FIGS. 1 through 5 thereof, numeral 10 designates a preferred embodiment of my improved disc implement. In FIG. 1 the improved disc implement is shown mounted on a tractor 12 by means of a three point hitch 13. As best shown in FIGS. 3, 4, and 5, the improved disc implement 10 has a main or support frame 14 consisting of a longitudinally disposed spine member 15 which has a pair of laterally extending forward arm members or forward arms 16 at the forward end of the spine member, in the direction of travel of the implement, and a pair of generally laterally disposed rearward arm members or rearward arms 18. The rearward arm members 18 rake forwardly to a moderate degree as they extend laterally outward from the spine member 15, while the forward arms 16 are disposed normal to the spine member 15, and extend outwardly only the width of the mounting frame hereafter described. A pair of stringer members 19 extend between the forward arms 16 and the rearward arms 18 in a generally oblique rearwardly and outwardly disposition to secure the outer ends of the forward and rearward arms together for strength.

A mounting frame 20 is attached to the support frame 14 at the forward end for mounting the implement on the three point hitch 13 of the tractor 12. The mounting frame 20 consists of two low point mounting spindles 22 which are positioned forwardly of the laterally extending forward arms 16 and an upper mounting spindle 24 which is formed by the A-frame configuration of two upwardly and inwardly extending upper support members 26. The upper connection spindle 24 is further supported by a pair of diagonal braces 28 which extend from the top of the mounting frame adjacent the upper mounting spindle 24 rearwardly and downwardly parallel to the longitudinal spine member 15 and connected to the rear portion of the longitudinal spine member 15 (see FIG. 5).

The implement has four gangs of discs, two forward gangs 30 and two rearward gangs 32. Each of the gangs consists of four disc blades 34 rotatably mounted on a disc blade axle 36 by assembly of disc spindles 37 in a manner well known in the art. More discs or less may be assembled on the gangs to suit the users preference.

Each of the disc gangs 30 and 32 has a disc gang frame 38 for mounting the disc gang to the implement. The disc gang frames 38 each have a mounting sleeve 39 with a square bore 40 (see FIGS. 6, 7 and 8). The mounting sleeves 39 are each connected to the disc blade axles 36 which support the disc blades 34 by means of an inner bearing strut 42 and an outer bearing strut 44. The bearing struts of each disc gang frame extend from the mounting sleeve 39 to the axle 36 and each of the mounting structs 42 and 44 have bearings (not shown) mounted at their distal ends which rotatably mount the axle of the disc gang. The inner bearing structs 42 are formed of a strap disposed in a generally horizontal position with its proximal end attached to the inner end of the mounting sleeve 39 and a bearing connecting plate 45 attached to its distal end. A brace 43 is provided for support of the distal end (see FIG. 7). The outer bearing struts 44 are formed of a strap set in a generally vertical plane with its proximal end attached to the outer end of the mounting sleeve 39 and its distal end having a bearing connecting plate 46 (see FIG. 8). To mount the disc gangs 30 and 32 on the support frame 14, pivotal mounting arms 48 are provided. The pivotal mounting arms 48 each have a proximal end disposed adjacent the spine member 15 of the support frame 14 and a distal end which extends laterally outward from the spine member. The pivotal mounting arms 48 are generally square in cross section and adapted to fit snuggly inside of the bores 40 of the mounting sleeves 39 of the disc gang frames 38, so that the disc gang frames 38 can move telescopically on the pivotal mounting arms (see FIGS. 9 & 10).

To provide my implement with a low profile in its lateral aspects, the rearward arms 18 are formed as an integral unit and mounted to the underside of the spine member 15. The pivotal mounting arms 48 are each pivotally attached to the rearward arms 18 adjacent their connection with the spine member 15 by means of a pair of spaced mounting ears 49 and a pivot bolt 50 which extends through corresponding aligned holes in the mounting ears 49 and pivotal mounting arm and is secured in position using a suitable nut. A forward pair of pivotal mounting arms 48 are attached to the forward side of each of the frame mounting arms 18 for connecting to the forward disc gangs 30, and a rearward pair are mounted on the rearward side of the frame mounting arms 18 for connecting to the rearward disc gangs 32 (see FIGS. 3-5).

The bearing struts 42 and 44 on each of the mounting sleeves 39 extend outwardly as well as downwardly from the mounting sleeves when the sleeves are mounted on the pivotal mounting arms 48, with the bearing struts on the forward gangs 30 directed forwardly and the bearing struts on the rearward gangs 32 directed rearwardly. The angle of descent of the bearing struts is such that the blades 34 on each of the disc gangs are disposed forwardly or rearwardly on the pivotal mounting arms 48, rather than beneath these arms, such that the tops of the disc blades 34 extend above the pivotal mounting arms, but below the bottom of the spine member 15. It will thus be understood that when so constructed, only the spine member 15, the forward arms 16 and mounting frame 20 and the forward ends of the stringer member 19 extend above the top of the blades 30. All other portions of the implement and particularly the portions extending laterally outward from the spine member 15 are below the disc tops thus providing my implement with the lowest possible lateral profile limited only by the disc diameters.

With the pivotal mounting arms 48 thus positioned, and a disc gang mounted on each one, the disc gangs 30 and 32 will be movable pivotally with respect to the direction of travel of the implement. The forward disc gangs 30 are movable from a rearward position in which the disc gang axles 36 are approximately 12° forward of a right angle position to the direction of travel (see FIG. 4) through a 16° position and a 20° position to a full forward position in which the axles of the forward disc gangs are oriented at substantially a 24° angle forwardly of a right angle position to the direction of travel (see FIG. 3).

The rearward disc gangs 32, on the other hand, will be movable from a forward position in which the disc gang axles 36 are approximately 12° rearward of a right angle position to the direction of travel (see FIG. 4), through a 16° position and a 20° position, to a full rearward position in which the axles of the rearward disc gangs are oriented at substantially a 24° angle rearwardly of a right angle with respect to the direction of travel (see FIG. 3).

Obviously, the particular angular positions in which the disc gangs can be located may be varied to suit the user, however these four positions have been found satisfactory for most uses.

In order to fix the pivotal mounting arms 48 in the aforementioned pivotal positions, plates 52 are mounted on the outer ends of the rearward arms 18, one on each arm (see FIGS. 3 and 4). The positioning plates 52 extend both forwardly and rearwardly of their point of mounting on the rearward arms and have a plurality of forward positioning holes 54 on their forward ends and a plurality of rearward positioning holes 56 on their rearward ends.

To secure the forward pivotal mounting arms 48 in a particular pivotal position by means of the forward positioning holes 54 on the forward portion of the positioning plates 52, a U-bolt 53 is passed upwardly on each side of the mounting sleeve 39, through a particular pair of the forward positioning holes 54, and secured with nuts in the usual manner. The rearward pivotal mounting arms 48 are secured at a particular pivotal position by means of a flange 55 on the forward side of the rearward mounting sleeves 39. The flange 55 has a series of spaced flange holes 57 positioned parallel to the mounting sleeve 39 which are selectively connectable to a particular one of the rearward positioning holes 56 by means of a drop pin or bolt 59. The forward positioning holes 54, the rearward positioning holes 56, and the flange holes 57 are disposed to achieve the particular pivotal positions of the forward disc gangs 30 and the rearward disc gangs 32 referred to above as more fully explained later.

Figure 11:
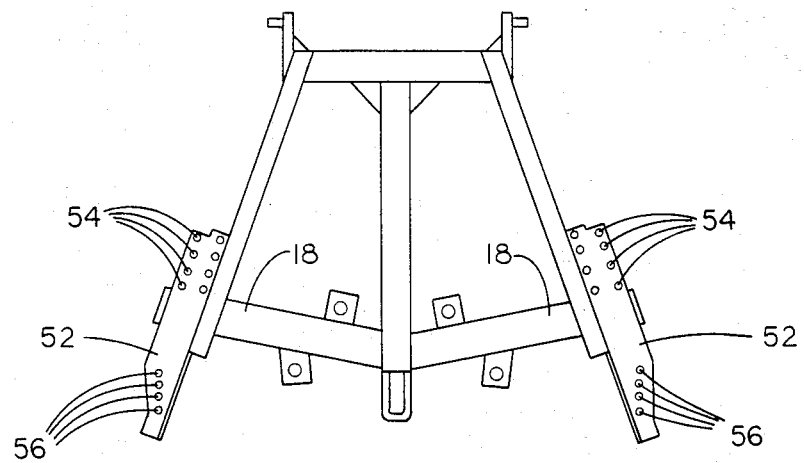
FIG. 11 is a top plan view of the support frame of the preferred embodiment of my invention.

To lock the mounting sleeves 39 of the disc gang frames 38 at a particular position in their range of telescopic movement on the pivotal mounting arms 48, a plurality of extension positioning holes 51 are provided in each of the pivotal mounting arms 48. For the same purpose pin passage 58 is provided through the inner end of the mounting sleeve 39 in the disc gang frame 38 of the rearward disc gangs 32 and two pin passages 58 are provided in each of the mounting sleeves 39 of the forward disc gangs 30, when a pin passage 58 is aligned with and locked in alignment with one of the extension positioning holes 51 using a pin 60, the disc gang frame 38 is thereby locked at a particular position in its range of telescopic movement on the pivotal mounting arm 48 (see FIGS. 10, 11, and 12.) The extension positioning holes 51 are spaced along the pivotal mounting arms 48 at predetermined locations to cooperate with the forward and rearward positioning holes 54 and 56 in the positioning plates 52 and achieve desired cultivation patterns as later more fully explained.

Figure 12:
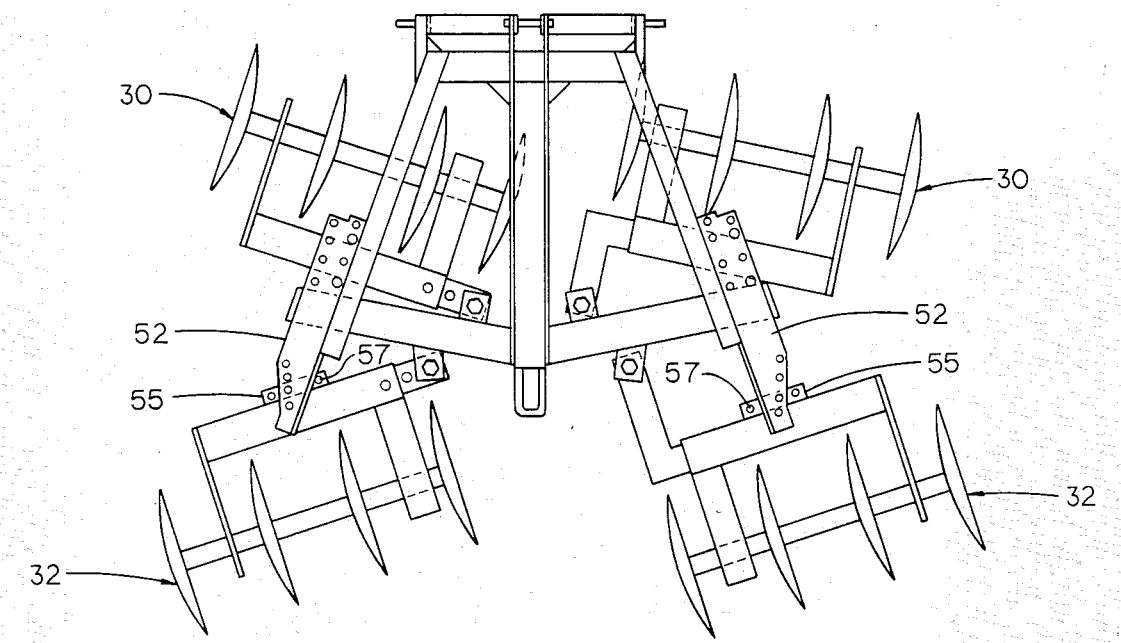
FIG. 12 is a top plan view of the preferred embodiment of my invention utilizing a pair of elbow pivotal mounting arms which permit still another positioning of disc gangs to provide yet a different cultivation pattern.
Figure 13:
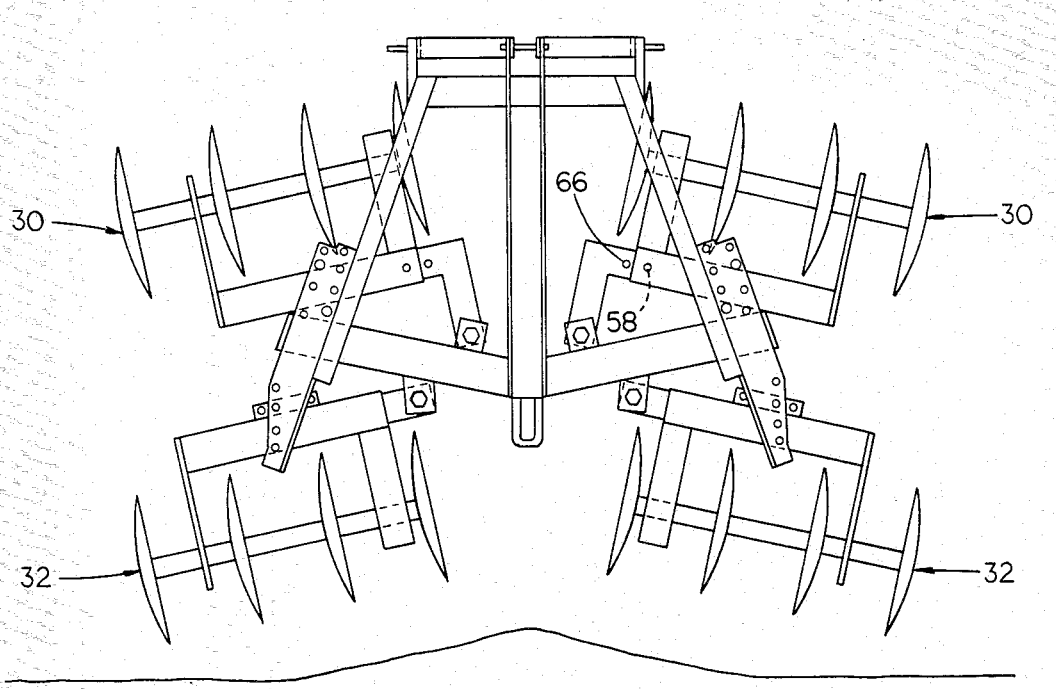
FIG. 13 is a top plan view of my preferred embodiment utilizing the elbow pivotal mounting arms to form a different position of the disc gangs from that shown in FIG. 12.
Figure 14:
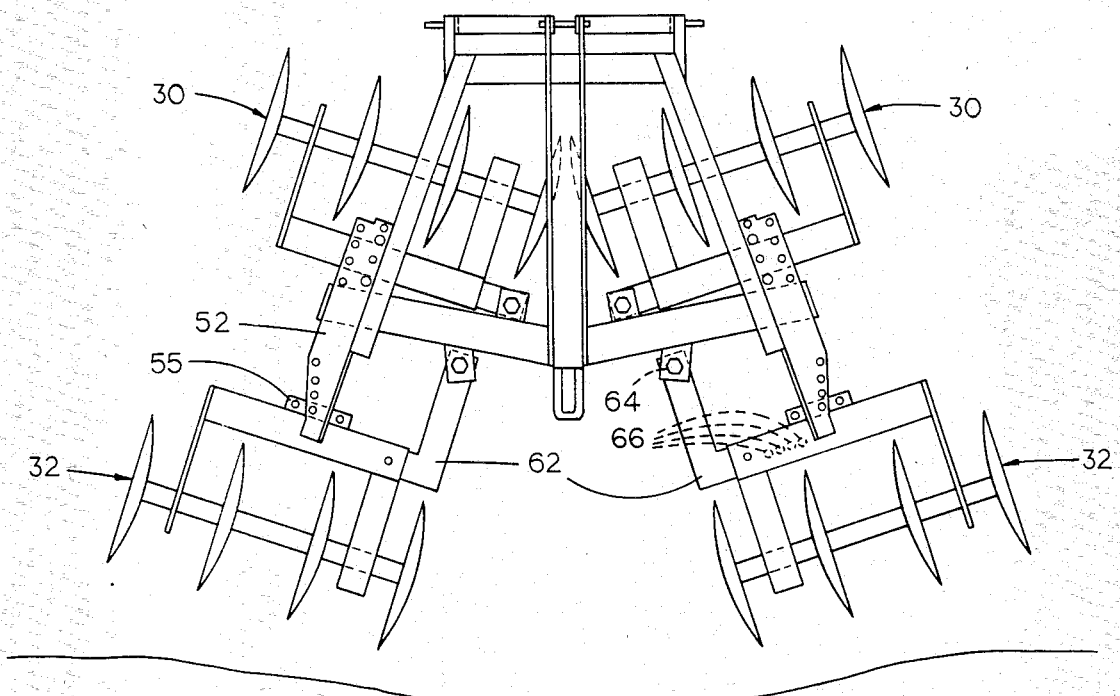
FIG. 14 is a top plan view of my preferred embodiment utilizing the elbow pivotal mounting arms to form yet another position of the disc gangs.

To provide even further variations in the relative positioning of the disc gangs 30 and 32, and the resultant different cultivation contours, my preferred embodiment includes a pair of elbow pivotal mounting arms 62 (see FIGS. 12, 13 and 14). The elbow pivotal mounting arms 62 have a right angle elbow about midway of their length and can be substituted for any of the straight pivotal mounting arms 48, by merely removing the pivot bolts 50 from the mounting ears 49, removing a straight pivotal mounting arm 48 and attaching an elbow mounting arm 62 in its place. The elbow pivotal mounting arms 62 have a mounting hole 64 in their proximal end and in their distal end beyond the right angle elbow have a series of spaced extension positioning holes 66 similar to the extension positioning holes 51 in the straight pivotal mounting arms 48.

At the rear of the spine member 15 I provide a slot 68 for mounting the shank of a foot plow (not shown), where desired, to eliminate any ridge formed between the disc gangs.

OPERATIONS

Having described the parts and structure of a preferred embodiment of my low profile disc implement, I will now describe its operation.

The implement is mounted on a three point tractor hitch 13 as shown in FIGS. 1 and 2 and raised for stowing or lowered for use as desired.

Before use, the disc gangs 30 and 32 are adjusted to provide the desired discing pattern. The disc gang positioning shown in FIGS. 3 and 4 are typical of positions found useful by many farmers. In FIG. 3 the front disc gangs are set inwardly on the pivotal mounting arms 48 so that the inside blades 34 on each of the disc gangs are in close proximity and are set at an angle of approximately 16° forward from perpendicular to the direction of travel.

In FIG. 4, the front disc gangs 30 are extended on the pivotal mounting arms 48 to the width desired to be covered by a pass of the implement, and are set at a 12° angle. The rear disc gangs 32 are positioned so that the next to inside blade 34 of each of the rear disc gangs engages the furrows made by the inside blade of each of the front disc gangs. The adjustment from the disc gang set-up of FIG. 3 to that shown in FIG. 4 is made as follows. First, the U-bolts 53 are removed from the forward positioning holes 54, the pivotal mounting arms 48 mounting each of the forward gangs are moved rearwardly to the 12° angle position and the U-bolts are reinserted in the available forward positioning holes and attached, but left loose. Next, the drop pins 60 through the aligned positioning holes 51 (in the pivotal mounting arms 48) and 58 (in the gang frame 39) are removed (see FIG. 10), and the forward disc gangs 30 are drawn laterally outwardly the distance desired. Positioning holes 51 and 58 are aligned in the desired new position and the drop pin 60 is reinserted. Then, the U-bolts 53 are tightened to secure the disc gangs in the new set up. As to the rear disc gangs 32, the drop pins 59 in the rearward positioning and flange holes 56 and 57 are removed and the drop pins 60 in the aligned holes 51 and 58 are also removed. The rear disc gangs are then moved inwardly and forwardly to the desired new positions and the respective extension positioning holes 51 and pin passages 58 are aligned as previously described. Similarly, the respective rearward positioning holes 56 and flange holes 57 are again aligned as previously described and the drop pins 59 and 60 reinserted in the holes and secured in position.

To achieve the operative configuration for the implement shown in FIGS. 12, 13 and 14, two of the pivotal mounting arms 48 are replaced by elbow pivotal mounting arms 62 in the manner previously described. Then the front disc gangs 30 and the rear disc gangs 32 are adjusted laterally and angularly as described above.

It should, therefore, be understood that my low profile tandem disc implement is very versatile with respect to providing cultivation patterns and quite easy to adjust to different patterns. Furthermore, regardless of the cultivation pattern used, the implement is capable of providing a low lateral profile limited only by the diameter of the disc blades 34, and, therefore, minimizes any interference of the implement with low hanging limbs or branches.

It should be further understood that the features of my invention, which permit adjustability of the disc gangs by pivotal and telescoping movements of the pivotal mounting arms are not restricted to low profile discs. They are usable as well in a high profile disc implements, where they provide the advantage of a shorter overall disc length by positioning the struts which depend from the gang frame mounting sleeves to the disc gang axles in a substantially vertical position.

From this detailed description of a preferred embodiment it should be understood that my invention is fully capable of achieving the objects and providing the advantages hereto attributed to it.

Although the invention has been herein shown and described in what is conceived to be the most practical and preferred embodiment, it is recognized that departures may be made therefrom within the scope of the invention, which is not to be limited to the illustrative details disclosed.

I claim:

1. An improved disc type agricultural implement comprising:

a support frame having a spine member disposed longitudinally with respect to the direction of travel of the implement, a pair of forward arms extending laterally, one on each side of said spine member adjacent to the forward end thereof and a pair of rear arms extending laterally outwardly and forwardly, one on each side of said spine member and adjacent the rearward end thereof, said forward arms being disposed normal to the longitudinal axis of said spine member and said rearward arms being raked forwardly at a predetermined acute angle with the longitudinal axis of said spine member;

a pair of forward pivot arms each having a proximal end mounted on the support frame substantially at a pivot point for pivotal movement relative to the spine member of said support frame between said forward arms and said rearward arms and adjacent said rearward arms, one on each side of said spine member, and a distal end extending outwardly from said pivot point thereof for pivotal movement in an arc thereabout;

a pair of rearward pivot arms each having a proximal end mounted on the support frame substantially at a pivot point for pivotal movement relative to the spine member of said support frame rearward of said rearward arms and adjacent to the rearward arms, one on each side thereof, and a distal end disposed radially outwardly from said pivot point thereof and movable in an arc with respect thereto;

a pair of forward disc gangs, each having a mounting frame including a tubular sleeve with a polygonal bore, a pair of struts extending radially outwardly with respect to the axis of said sleeve and having proximal ends interconnected with said sleeve and distal ends extended therefrom, a disc blade shaft rotatably mounted in the distal ends of said struts and a plurality of disc blades coaxially mounted on said shaft;

a pair of rearward disc gangs each having a mounting frame including a tubular sleeve with a polygonal bore, a pair of struts connected at a proximal end to said sleeve and extending radially outwardly therefrom to a distal end, a disc blade rotatably mounted in the distal end of said struts and a plurality of disc blades coaxially mounted on said shaft;

said mounting frame sleeves of said forward and rearward disc gangs telescopically assembled with a particular one of said forward and rearward pivot arms and being adjustably positionable lengthwise on said pivot arms by releasable hole and pin means;

pivot arm positioning means mounted on the distal ends of said rear arms of said support frame including positioning plates extending longitudinally with respect to the direction of travel of said implement fore and aft of the distal ends of said rear arms and having a plurality of holes in the ends thereof; and releasable forward connector means interconnected with the forward ends of said positioning plates and said forward pivot arms and the disc gang frames mounted thereon for releasably locking said forward pivot arms in a particular pivot position and releasable rearward connector means interconnected with the rearward ends of said positioning plates and said rearward pivot arms and the disc gang frames mounted thereon releasably to lock said rearward pivot arms in a particular pivot position.

2. An improved disc type agricultural implement as described in claim 1, wherein:

said sleeves of said mounting frames of the disc gangs are movable axially with respect to said pivot arms for adjustment of the laterally extending positions of said mounting frames of the disc gangs; and axial locking means disposed releasably to lock said sleeves on said pivot arms in particular positions of lateral extension.

3. An improved disc type agricultural implement as described in claim 1, wherein:

said pivot arms are so disposed that said disc blades of said forward disc gangs and said rearward disc gangs extend to a height above said pivot arms.

4. An improved disc type agricultural implement as described in claim 1, wherein:

said tubular sleeves of said forward disc gangs and said rearward disc gangs are rectangular in cross section.

5. An improved disc type agricultural implement comprising:

a rigid frame having a forward end and a rearward end with respect to the direction of travel of said implement, said frame including an elongated centrally disposed spine member positioned centrally and longitudinally with respect to the direction of travel of said implement and a pair of arm members interconnected at their proximal ends with the rear portion of said spine member and individually extending laterally outwardly and forwardly from said spine member to form acute angles with said spine member on each side thereof;

a first pair of pivot arms each having a proximal end pivotally mounted on a forwardly directed portion of one of said frame arm members one on each side of said spine member and a distal portion disposed to extend laterally outwardly and forwardly of said frame arm member and being movable pivotally about said pivotal interconnection, said first pivot arms having generally polygonal cross sections;

a second pair of pivot arms each having a proximal end pivotally mounted on a rearwardly directed portion of one of said frame arm members one on each side of said spine member and a distal portion disposed to extend laterally outwardly and rearwardly of said frame arm members and being movable pivotally about said pivotal interconnection, said second pivot arms having generally polygonal cross sections;

a plurality of disc gangs each including a disc gang frame having an elongated sleeve member with a generally polygonal bore adapted for telescopic assembly with one of said pivot arms, a pair of struts interconnected at their proximal ends with said sleeve member and extending radially outwardly therefrom and distal ends having means for rotatably mounting a shaft therein;

a disc blade shaft rotatably mounted on the distal ends of said struts and a plurality of disc blades coaxially mounted on said shaft, said disc blades having a diameter greater than the height of said pivot arms and being disposed forwardly of said disc gang sleeve member whereby when said sleeve member is telescopically assembled with one of said pivot arms said disc blades extend above said pivot arm and out of conflict therewith;

pivot arm positioning means mounted adjacent to the distal ends of said arm members of the frame, said positioning means including an elongated longitudinally disposed plate extending longitudinally fore and aft from said arm members of the frame and having a plurality of holes disposed in a predetermined pattern in the fore and aft portions thereof; and connector means operatively associated with the distal ends of said first and second pivot arms and said positioning means and disposed releasably to lock said pivot arms in particular pivotal positions.

6. An improved disc type agricultural implement as described in claim 5, in which:

said struts of each of said disc gang frames extend downwardly and forwardly from said sleeve member at an angle which disposes said sleeve member below the tops of said disc blades.

7. An improved disc type agricultural implement as described in claim 6, in which:

said first pair of pivot arms, said second pair of pivot arms and said sleeve members are each square in cross section.

8. An improved disc type agricultural implement comprising a rigid main frame adapted for earth traversing movement, an arm pivotally mounted on the rigid main frame for movement about a substantially vertical axis through a range of pivotal positions, a mounting frame borne by the arm for movement relative thereto substantially toward and from said substantially vertical axis through a range of longitudinal positions, a disc gang mounted on the mounting frame for earth engagement during said earth traversing movement, and an assembly borne by the main frame for releasably fixing the main frame, the arm and the mounting frame relative to each other and the mounting frame in one of said pivotal and longitudinal positions.

9. The improved disc type agricultural implement of claim 8 wherein said mounting frame and arm have portions disposed in slidable mating enagement and said portions are angular in cross section to prevent movement of said portion of the mounting frame about the axis of said portion of the arm.

10. The improved disc type agricultural implement of claim 8 wherein said assembly includes a plate borne by the main frame in spaced relation to said substantially vertical axis and substantially transversely related to the arm in said range of pivotal positions and means for releasably interlocking the plate, the arm and the mounting frame.

11. The improved disc type agricultural implement of claim 8 wherein said mounting frame and arm are telescopically engaged for slidable movement of the mounting frame within said range of longitudinal positions.

12. An improved disc type agricultural implement comprising a main frame adapted for earth traversing movement, an arm mounted on the main frame for substantially pivotal movement about a substantially vertical axis through a range of pivotal positions, a mounting frame borne by the arm for movement therealong toward and from said substantially vertical axis through a range of longitudinal positions, a disc gang mounted on the mounting frame for earth engagement during said earth traversing movement, and individual means for securing said arm in a selected position within said range of pivotal positions and said mounting frame in a selected position on the arm within said range of longitudinal positions, said mounting frame securing means including holes provided in said mounting frame and said arm and a pin selectively positionable in said holes releasably to lock the mounting frame in a selected one of said longitudinal positions on the arm.

13. An improved disc type agricultural implement comprising a main frame adapted for earth traversing movement, an arm mounted on the main frame for substantially pivotal movement about a substantially vertical axis through a range of pivotal positions, a mounting frame telescopically engaged with the arm for slidable movement of the mounting frame therealong toward and from said substantially vertical axis through a range of longitudinal positions, a disc gang mounted on the mounting frame for earth engagement during said earth traversing movement, and means for securing said arm in a selected position within said range of pivotal positions and said mounting frame in a selected position on the arm within said range of longitudinal positions.

14. An improved disc type agricultural implement comprising a main frame adapted for earth traversing movement, an arm mounted on the main frame for substantially pivotal movement about a substantially vertical axis through a range of pivotal positions, a mounting frame borne by the arm for movement therealong toward and from said substantially vertical axis through a range of longitudinal positions, a disc gang mounted on the mounting frame for earth engagement during said earth traversing movement, and individual means for securing said arm in a selected position within said range of pivotal positions and said mounting frame in a selected position on the arm within said range of longitudinal positions, said arm securing means including a plate borne by the main frame in spaced relation to said substantially vertical axis and substantially transversely related to the arm in said range of pivotal positions and means for releasably interlocking the plate, the arm and the mounting frame in one of said pivotal positions.

* * * * *

UNITED STATES PATENT AND TRADEMARK OFFICE
CERTIFICATE OF CORRECTION

PATENT NO. : 4,501,333
DATED : February 26, 1985
INVENTOR(S) : Bernard O. Domries It is certified that error appears in the above-identified patent and that said Letters Patent are hereby corrected as shown below:

Column 2, line 40, delete "view";

Column 2, line 40, delete "mounted" and insert ---mounting---;

Column 3, line 46, delete "structs" and insert ---struts---;

Column 3, line 49, delete "structs" and insert ---struts---;

Column 5, line 33, delete "30, when" and insert ---30. When---;

Column 5, line 53, insert ---pivotal--- between "elbow" and "mounting";

Signed and Sealed this

Sixth Day of August 1985

[SEAL]

Attest:

DONALD J. QUIGG

Attesting Officer   Acting Commissioner of Patents and Trademarks